United States Patent
Brodie

(10) Patent No.: US 7,025,889 B2
(45) Date of Patent: Apr. 11, 2006

(54) SHIP BALLAST WATER STERILIZATION METHOD AND SYSTEM

(76) Inventor: Paul F. Brodie, 6215 Coburg Road, Halifax, Nova Scotia (CA) B3H 1Z8

( * ) Notice: Subject to any disclaimer, the term of this patent is extended or adjusted under 35 U.S.C. 154(b) by 0 days.

(21) Appl. No.: 10/471,800

(22) PCT Filed: Mar. 14, 2002

(86) PCT No.: PCT/CA02/00359

§ 371 (c)(1), (2), (4) Date: Mar. 1, 2004

(87) PCT Pub. No.: WO02/074692

PCT Pub. Date: Sep. 26, 2002

(65) Prior Publication Data

US 2004/0134861 A1    Jul. 15, 2004

(30) Foreign Application Priority Data

Mar. 16, 2001  (CA) .................................. 2341089

(51) Int. Cl.
*C02F 1/32* (2006.01)
(52) U.S. Cl. ...................... 210/748; 210/746; 210/153; 210/194; 210/232; 422/24; 422/186
(58) Field of Classification Search ................ 210/746, 210/748, 153, 194, 232; 422/24, 186
See application file for complete search history.

(56) References Cited

U.S. PATENT DOCUMENTS

| 4,008,045 A | 2/1977 | Free |
|---|---|---|
| 4,274,970 A | 6/1981 | Beitzel |
| 4,505,477 A | 3/1985 | Wilkinson |
| 4,621,195 A | 11/1986 | Larsson |
| 5,785,845 A | 7/1998 | Colaiano |
| 5,932,112 A | 8/1999 | Browning, Jr. |
| 6,090,296 A | 7/2000 | Oster |
| 6,171,508 B1 * | 1/2001 | Browning, Jr. ............. 210/750 |
| 6,402,965 B1 * | 6/2002 | Sullivan et al. ............. 210/748 |
| 6,447,720 B1 * | 9/2002 | Horton et al. ................. 422/24 |
| 6,500,345 B1 * | 12/2002 | Constantine et al. ....... 210/747 |
| 6,613,232 B1 * | 9/2003 | Chesner et al. ............. 210/650 |

FOREIGN PATENT DOCUMENTS

CA    1009019    4/1997

(Continued)

*Primary Examiner*—Betsey Morrison Hoey
(74) *Attorney, Agent, or Firm*—Sughrue Mion, PLLC

(57) ABSTRACT

A method and system for continuously treating ship ballast water enroute to reduce or eliminate harmful microorganisms therefrom, before discharge of the ballast water into coastal waters. During the ships voyage, and before the ballast water is discharged, the ballast water is continually passed through an interconnected UV sterilization system for treatment by ultraviolet radiation. One or more dispensing pumps are provided to transport the ballast water through the length of the UV system, which includes one or more UV units to process and sterilize the ballast water. In cases where large volumes of water need to be processed or where individual ship design is limiting, secondary piping to divert the flow of ballast water from the main piping system through placement of diverter valves, may be added to incorporate additional UV units or pumps. Flow jets secured to the inside of a ballast tank or hold may also be used to ensure proper circulation and mixing of the ballast water to be treated.

16 Claims, 6 Drawing Sheets

FOREIGN PATENT DOCUMENTS

| | | |
|---|---|---|
| CA | 2248706 | 9/1997 |
| CA | 2262678 | 2/1998 |
| CA | 2270434 | 6/1998 |
| CA | 2399664 | 9/2000 |

* cited by examiner

SHIP BALLAST WATER STERILIZATION METHOD AND SYSTEM

The present invention relates generally to the field of treating of ship ballast water, which may contain potentially undesirable organisms, and more specifically to a method and apparatus for treating ship ballast water, so as to avoid these microorganisms from being transported from one coastal habitat to another.

The increase in size of oceangoing vessels and frequency of ship transport has ecological consequences regarding the discharge of ballast water in distant waters, including open ocean and foreign ports. Around the world more than 10 billion tonnes of ballast water are carried in ships each year containing thousands of species of aquatic animals and plants. This can create ecological problems, for both the marine environment and human health, when this ballast water, especially when obtained from distant waters, is transferred by vessels and introduced into foreign aquatic ecosystems. This type of ship ballast water transfer can threaten aquatic flora and economies that depend on healthy aquatic ecosystems, or just upset the balance of these ecosystems, an example being the introduction and proliferation of the Zebra Mussel into the Great Lakes ecosystem. The transportation of ballast water cannot be stopped, but the transfer of potentially harmful aquatic organisms can be minimized by suitable treatment.

DESCRIPTION OF THE PRIOR ART

Once a ship has unloaded cargo in a foreign port, the holds within the ship which previously held good and materials are obviously empty. These holds are often filled with sea water taken from the harbour of the unloaded vessel as ballast so as to stabilize the ship. When the ship journeys to the waters of another foreign port, the ship or vessel typically discharges this ballast water upon arrival, preparatory to loading a cargo, thereby introducing potentially harmful microorganisms to the ecosystem surrounding this foreign port.

One current proposal for dealing with this problem is for vessels to exchange and replace, in mid-ocean far away from coastal waters, the ballast water originally taken on with water from the open high seas. Such a transfer can safely be accomplished if the amount of water to be transferred is relatively small, or if the prevailing weather conditions surrounding the vessel are favourable. However, cargo holds and large ballast tanks in many ocean-going vessels are usually very large spaces. Because of this, they must be kept completely full or completely empty so that interior wave action does not result. If the prevailing weather conditions surrounding the vessel resulted in heavy seas during the pumping and exchange process, then attempting such a mid-ocean transfer of ballast water from such a large space could prove very dangerous for the ship, in that as water is pumped from a hold, and the water level therein accordingly decreases, which could lead to the generation of an internal wave action which could destabilize the ship.

The problem of safely exchanging ballast water from vessels is one of long standing, which has not yet been satisfactorily solved. U.S. Pat. No. 5,192,451 describes a method of controlling the growth of zebra mussels in ship ballast water by adding a polymer to the ballast water. However, the use of chemicals to treat ballast water, which are later discharged into coastal waters, may have an adverse environmental effect on the ecosystem. U.S. Pat. Nos. 5,376,282 and 5,578,116 describe the use of a vacuum and agitation for reducing the dissolved oxygen of natural source water specifically to a level below that sufficient to support the survival respiration of zebra mussels. However, there is no specific discussion of treating ballast water with UV sterilization in a process which solves the general problem of the transfer of microorganisms in the ballast water of a vessel or ship from any one to any other coastal area; nor is there any discussion of continuous cycling and treatment of the water for a period of time in a sealed space to reduce the population of a wide spectrum of biologically diverse microorganisms. U.S. Pat. No. 3,676,983 describes an apparatus including a vacuum chamber and an agitator for removing gases from a liquid. However, there is no recognition of the problem of microorganism treatment in ship ballast water, or that of the removal of dissolved oxygen in the water is reduced to a level where aerobic microorganisms are killed. U.S. Pat. No. 4,316,725 describes several methods, including the use of a vacuum, to remove dissolved oxygen from water. U.S. Pat. No. 3,251,357 proposes injecting combustion/stack gases into water for treating the water to inhibit the growth of microorganisms. However, there is no recognition of, or suggested solution for, the removal of microorganisms from ship's ballast water.

SUMMARY OF THE INVENTION

Thus, a primary object of the present invention is to provide a method and system whereby large amounts of ship ballast water can be treated using UV radiation in a cost-effective and time-effective manner to kill substantially all of the microorganisms in the ballast water. Such large amounts contemplate, for example, from 40,000 to 60,000 tons of ballast water which is typical for a 150,000 ton bulk cargo carrier to be carrying for stability, and which would require treatment over a period of days.

The UV sterilization process for ballast water of the present invention differs from other UV sterilization processes and apparatuses in the following ways:

1. It is designed to be capable of operating at the very high flow rates necessary to be effective in high capacity requirements, including large modern cargo ships.
2. It is designed to completely or substantially completely eradicate microorganisms from ballast water by continuously cycling the ballast water containing microorganisms through a UV sterilization unit, during the travel time of a vessel or ship. This continuous cycling provides for a greater sterilization ability of the UV unit.
3. By providing a design whereby several ballast tanks and holds, as well as UV sterilization units, may be arranged in parallel as needed to handle greater volumes of ballast water. Use of diverter valves designed to divert water flow from the main transfer cycle of the UV sterilization flow, to a secondary piping ballast water flow cycle involving the additional UV sterilization units or ballast tanks/holds, provides for greater adaptability and flexibility with regards to differing ship designs and water hold volumes.
4. The use of a UV intensity probe, positioned within each UV sterilization chamber, to monitor the exposure rate of the ballast water contained therein and therefore assist in monitoring the UV treatment process.
5. The use of flow jets, positioned within ballast tanks or holds, to assist in circulating and mixing the internal flow of water within the system, so as to maximize the sterilizing potential of the method of the present invention. Microorganisms within the water that are situated near the bottom of the ballast tank or hold may then, by mixing through the use of the flow jets, be adequately circulated within the tank or hold so that when the ballast water is cycled to the UV sterilization chamber, the likelihood of microorganisms remaining near the bottom of a tank or hold and avoiding this cycling process, and thereby escaping sterilization, is reduced.

One aspect of the present invention provides a method of treating ship ballast water to reduce or eliminate the content of microorganisms therein, which comprises: transferring ballast water from a ballast tank or hold of a ship to a treatment site; subjecting transferred ballast water to UV radiation for a time and at a sufficient intensity to significantly reduce the content of living microorganisms therein, and cycling treated ballast water back to a ballast tank or hold of the ship.

A particular aspect of the present invention provides for a method of treating ship ballast water to reduce or eliminate the content of microorganisms therein, which comprises: adapting the ballast tank to provide an inlet opening and an outlet opening on opposing sides of the ballast tank for allowing pipe access thereto, whereby the flow of the ballast water into and out of the ballast tank can occur; providing a dispensing pump having an opening for pipe access thereto, and adapted to transfer or cycle the ballast water; positioning a source of UV radiation within a treatment site having an opening for pipe access thereto; providing a transfer pipe operably interconnecting the dispensing pump, the treatment site and the ballast tank, whereby the transfer pipe operably links together the openings whereby ballast water can be transferred therein; providing a seal interconnecting the openings to the transfer pipe to prevent the ballast water from leaking as it is transferred or cycled; transferring ballast water from a ballast tank of a ship to a treatment site; subjecting transferred ballast water to the source of UV radiation for a time and at a sufficient intensity to significantly reduce the content of living microorganisms therein; monitoring UV exposure rate of the ballast water through use of a UV intensity probe positioned within the treatment site; and cycling treated ballast water back to a ballast tank or hold or another ballast tank or hold of the ship.

Another particular aspect of the present invention provides a method of treating ship ballast water to reduce or eliminate the content of microorganisms therein, which comprises: adapting the ballast tank to provide an inlet opening and an outlet opening on opposing sides of the ballast tank for allowing pipe access thereto, whereby the flow of the ballast water into and out of the ballast tank can occur; providing a dispensing pump having an opening for pipe access thereto, and adapted to transfer or cycle the ballast water; positioning a source of UV radiation within a treatment site having an opening for pipe access thereto; providing a transfer pipe operably interconnecting the ballast tank and a second transfer pipe, the second transfer pipe operably interconnecting the dispensing pump and the treatment site, whereby ballast water can be transferred therein; providing a seal interconnecting the openings to the transfer pipe and the second transfer pipe to prevent the ballast water from leaking as it is transferred or cycled; providing a filter operably positioned within the transfer pipe, whereby the flow of ballast water into and through the transfer pipe can be filtered; positioning a diverter valve within the transfer pipe wherein the flow of ballast water travelling within the transfer pipe can be diverted to the second transfer pipe, and wherein the second transfer pipe interconnects the treatment site and the dispensing pump, to transfer ballast water therethrough; transferring ballast water from a ballast tank of a ship to the transfer pipe; transferring ballast water from the transfer pipe to the second transfer pipe; subjecting transferred ballast water to the source of UV radiation for a time and at a sufficient intensity to significantly reduce the content of living microorganisms therein; monitoring UV exposure rate of the ballast water through use of a UV intensity probe positioned within the treatment site; transferring ballast water from the second transfer pipe to the transfer pipe; and cycling treated ballast water from the transfer pipe back to a ballast tank or hold or another ballast tank or hold of the ship.

Another aspect of the present invention provides a system for treating ship ballast water to reduce or eliminate the content of microorganisms therein, which comprises: a treatment site; means for transferring ballast water from a ballast tank or hold of the ship to said treatment site; UV radiation means for subjecting transferred ballast water in said treatment site to UV radiation to reduce or eliminate microorganisms therefrom; and means for cycling treated water back to a ballast tank or hold of the ship.

A still further aspect of the present invention provides a system of treating ship ballast water to reduce or eliminate the content of microorganisms therein, which comprises: adapting the ballast tank to provide an inlet opening and an outlet opening on opposing sides of the ballast tank for allowing pipe access thereto, whereby the flow of the ballast water into and out of the ballast tank can occur; pump means having an opening for pipe access thereto, and adapted to transfer or cycle the ballast water; UV radiation means positioned within a treatment site having an opening for pipe access thereto; transfer pipe means operably interconnecting the pump means, the treatment site and the ballast tank, whereby the transfer pipe means operably links together the openings whereby ballast water can be transferred therein; sealing means adapted to seal the openings to the transfer pipe means interconnecting the openings to prevent the ballast water from leaking as it is transferred or cycled; means to transfer ballast water from a ballast tank of a ship to a treatment site; irradiating transferred ballast water in treatment site to UV radiation to significantly reduce or eliminate microorganisms therein; UV intensity probe means positioned within the treatment site to monitor UV exposure rate of the ballast water; and means to cycle treated ballast water back to a ballast tank or hold or another ballast tank or hold of the ship.

A further aspect of the present invention provides a system of treating ship ballast water to reduce or eliminate the content of microorganisms therein, which comprises: adapting the ballast tank to provide an inlet opening and an outlet opening on opposing sides of the ballast tank for allowing pipe access thereto, whereby the flow of the ballast water into and out of the ballast tank can occur; pump means having an opening for pipe access thereto, and adapted to transfer or cycle the ballast water; UV radiation means positioned within a treatment site having an opening for pipe access thereto; transfer pipe means operably interconnecting the ballast tank and a second transfer pipe means, the second transfer pipe means operably interconnecting the pump means and the treatment site, whereby ballast water can be transferred therein; filter means operably positioned within the transfer pipe means, whereby the flow of ballast water into and through the transfer pipe can be filtered; diverter valve means positioned within the transfer pipe means wherein the flow of ballast water travelling within the transfer pipe means can be diverted to the second transfer pipe means, and wherein the second transfer pipe means interconnects the treatment site and the pump means, to transfer ballast water therethrough; sealing means adapted to seal the openings to the transfer pipe means and the second transfer pipe means interconnecting the openings to prevent the ballast water from leaking as it is transferred or cycled; means to transfer ballast water from a ballast tank of a ship to the transfer pipe means; means to transfer ballast water from the transfer pipe means to the second transfer pipe means; irradiating transferred ballast water to the UV radiation means for a time and at a sufficient intensity to significantly reduce the content of living microorganisms therein; UV intensity probe means positioned within the treatment site to monitor UV exposure rate of the ballast water; means to transfer ballast water from the second transfer pipe means to the transfer pipe means; and means to cycle treated ballast water from the transfer pipe means back to a ballast tank or hold or another ballast tank or hold of the ship.

It should be noted that the above method and system for treating ballast water to kill microorganisms therein are uniquely suitable for use on ocean-going vessels where several days at a time are available for carrying out the UV sterilization treatment. Continuous cycling of the ballast water through the UV sterilization chamber, as is provided in the present invention, during the vessel's travel time will render the treatment even more effective. Where necessary, the power to run the pumps and UV sterilization system of the present invention may be supplied, for example, from connection to the ship's engine room. The method and system as described above may also include one or more ballast tanks or holds of a ship arranged in parallel, as opposed to a singular ballast tank or hold, by having transfer piping connected at opposing sides of each of the one or more ballast tanks or holds of a ship, arranged in parallel, whereby a continuous and constant cycle of water flowing from the ballast tanks or holds through the UV sterilization chamber may be achieved. To assist in the internal mixing of water, and microorganisms, within each of the ballast tanks or holds, flow jets may be located on the sides or bottom of any of the ballast tanks or holds so as to maximize the sterilizing potential of the present invention. Microorganisms within the water that are situated near the bottom of the ballast tank or hold may then, by mixing of the flow jets, be moved nearer the surface of the tank or hold so that when the ballast water is cycled to the UV sterilization chamber, the likelihood of microorganisms remaining near the bottom of a tank or hold, and thereby escaping sterilization, is reduced. In a similar manner, the normal movement of the ship itself, including movement induced by wave action, will also assist in the internal mixing of ballast water from top to bottom within the tank or hold, and help to ensure that microorganisms within the ballast water are more likely to be adequately circulated and encounter close proximity to the UV radiation source within the UV sterilization unit, and thus more readily be neutralized.

The present invention may be installed on board a ship, and may use pre-existing pumps and/or piping on the ship. The arrangement of flow jets and flow transfer pipes would be specific to the design of the individual hold or ballast tank the present invention is to be used in conjunction with. It is to be noted that retrofitting of existing vessels may require that some of this flow transfer piping be run along the deck to specific hold or ballast tanks, depending, of course, upon the individual design of each ship. The direction for continuously cycling the flow of ballast water is also variable, in that the ballast water flow may take either a clockwise or counterclockwise direction.

The present invention essentially comprises a UV sterilization process and apparatus which continuously cycles ballast water on ships in transit through a UV sterilization chamber, to reduce microorganisms in the ballast water. Ballast water containing microorganisms is taken unto a ship or vessel and then processed through a mechanical filtration system, in order to remove larger microorganisms or debris, and thus avoid fouling of the UV sterilization system, before the ballast water is then stored in the ballast tanks or holds of the ship. This mechanical filtration system can be as simple as a metal meshwork placed over the inlet and outlet openings where the transfer pipe joins the ballast tank or holds. Normally, the intake opening where the ship draws ballast water from the ocean may also have a metal meshwork filter as well, and this is simply an extra protective measure to ensure larger pieces of debris, fish, seaweed or the like, do not enter into and foul the treatment system. The mechanical filter, or meshwork, may be substantially flat, but may also comprise an outwardly extending convex dome shape. Use of such a domed shape on the meshwork increases the surface area of the mesh, thus dispersing and reducing the force of suction as water flows through the mesh, as well as decreasing the likelihood of large objects clogging the filter, by virtue of the larger surface area and the curved surface. In one embodiment of the present invention, where only one ballast tank or hold containing ballast water is to be sterilized, there is provided in a hold or tank an inlet opening and an outlet opening, positioned on opposite sides from each other. From a hold, there is attached to the outlet opening of a hold a section of flow-through transfer pipe. This flow-through transfer pipe may be connected and sealed to the outlet opening by a connector, such as, for example, a large flange, which can be bolted or welded to the ballast tank or hold openings.

The transfer pipe is then placed, in a length as needed within the ship, to join together a hold containing ballast water, along with a dispensing pump, and a UV sterilization unit, in a complete, sealed circuit, through which ballast water may flow. The dispensing pump, when in its normal operation, forces water from the outlet opening of a hold to flow into the length of transfer pipe, from which the ballast water is then distributed to enter one end of the UV sterilizing chamber. Upon passing through this UV chamber, the ballast water is irradiated and undergoes a sterilization process by a UV radiation source, positioned within the UV sterilization chamber. If desirable, a UV intensity probe may be used within the UV chamber to monitor the light intensity and exposure rate of the ballast water within the UV chamber. The flow rate of the circulating ballast water within the treatment process can also be varied by controlling the pump speed, which can increase or decrease the exposure or "residence" time of the ballast water in the UV chamber, depending upon the particular pump speed selected. Once the ballast water has passed within and throughout the length of the UV sterilizing unit, the ballast water is then forced out of the opposite end of the UV chamber, both by the pumping action of the dispensing pump as well as by the weight of more ballast water entering the UV chamber from behind, to flow again into the length of transfer pipe connected to the UV chamber. The ballast water then completes the flow circuit by journeying the length of the transfer pipe, into the inlet opening of the hold from which it originated, to begin the cycle again. In this way, as the pump continues to operate, ballast water may, throughout the course of a ship's journey, travel through the complete sealed UV sterilization circuit countless times to pass through the UV sterilization chamber and be irradiated by the UV radiation source therein, thus increasing the purification of the ballast water. If there are several holds containing ballast water to be sterilized, then depending upon the layout of the ship it may be necessary to join and several large sections of transfer pipe together so that each of the individual holds containing ballast water can be joined together within the continuous sterilization cycle. In this embodiment, using as an example two holds containing ballast water, the transfer pipe would be placed, in a length as needed within the ship, to join together in a flow cycle each of the holds containing ballast water, along with the dispensing pump, and a UV sterilization unit, in a complete, sealed circuit. The dispensing pump, as it operates, forces water to move from the outlet opening of a hold to flow into the length of transfer pipe, and enter the inlet opening of a second hold, from where it will then exit the outlet opening of this second hold into the transfer pipe, from which the ballast water is then distributed to enter one end of the UV sterilizing chamber, and pass through the UV sterilization chamber. As in the first embodiment, the ballast water will again be irradiated by the UV radiation source positioned within the UV sterilization chamber as it moves through the UV sterilization chamber. The ballast water is then forced by the constant action of water forced by the operation of the dispensing pump to exit the opposite end of the UV sterilization chamber to return to the transfer pipe, from where the flow cycle is completed as the ballast water is returned to the hold or tank from where it originated.

In a third embodiment of the present invention, where only one ballast tank or hold containing ballast water is to be sterilized, ballast water containing microorganisms is taken into a ship or vessel and then processed through a mechanical filtration system, before the ballast water is then stored in the ballast tank or hold of the ship, where there is provided an inlet port and an outlet port, positioned on opposite sides of the hold or tank from one another. From a hold, there is attached to the outlet port of a hold a section of flow-through transfer pipe. This flow-through transfer pipe may be connected and sealed to the outlet port by a connector, such as a sealing ring. The transfer pipe is placed, in a length as needed within the ship, to join together in a flow circuit a hold containing ballast water, along with a dispensing pump, and a UV sterilization chamber, in a complete, sealed circuit, through which ballast water may flow. Within this flow circuit, and somewhere along the length of the transfer pipe, there is provided one or more diverter valves, at which point the flow of the ballast water travelling within the transfer pipe may be diverted to flow within the length of a secondary transfer pipe connected to the transfer pipe. This secondary transfer pipe is connected to join and seal together a dispensing pump, and a UV sterilization chamber so that ballast water diverted from the transfer pipe to then flow within the secondary transfer pipe, is then processed and irradiated through the dispensing pump and UV sterilization chamber. Once the processing is completed, the ballast water exits the UV sterilization chamber to return to the secondary transfer pipe, where it then flows back to the transfer pipe from which it originally was diverted to return to the hold or tank from which it originated, and to begin the cycle again. In this embodiment then, the dispensing pump, when in its normal operation, forces water from the outlet port of a hold to flow into the length of transfer pipe, from which the ballast water is then diverted by a diverter valve to flow into a secondary transfer pipe, and then pass through a dispensing pump. The ballast water is then forced into the secondary transfer pipe to enter one end of the UV sterilizing chamber. Upon passing through this UV chamber, the ballast water is irradiated and undergoes a sterilization process by a UV radiation source, positioned within the UV sterilization chamber. Once the ballast water has passed within and throughout the length of the UV sterilizing chamber, the ballast water is then forced out of the opposite end of the UV chamber, both by the pumping action of the dispensing pump as well as by the weight of more ballast water entering the UV chamber from behind, to flow again into the length of secondary transfer pipe connected to the UV chamber. The ballast water then is pushed the length of the secondary transfer pipe to a second diverter valve, where the flow of ballast water is gain diverted to return to the transfer pipe, wherein the ballast water will then journey through the inlet opening of the hold from which it originated, to begin the cycle again.

In a further embodiment of the present invention, it will be noted that it is possible to have one dispensing pump along the length of the transfer pipe to push ballast water within the flow circuit, and another dispensing pump within the length of the secondary transfer pipe, as needed, to handle the volume of water within the flow circuit, or to increase the flow rate of the ballast water. It should be noted that if the volume of ballast water to be processed is heavy, it is also possible to have more than one UV sterilization chamber within the length of secondary pipe. By adding additional sections of secondary pipe, separate UV units may be arranged, in parallel, to handle the excess volume of the ballast water. In this manner, the design and arrangement of the present invention may be flexibly adjusted to accommodate the peculiarities of each individual ship's design, and thus still ensure efficient processing of ballast water.

BRIEF DESCRIPTION OF THE DRAWINGS

Embodiments of the present invention will be further described with reference to the accompanying drawings, in which.

DETAILED DESCRIPTION OF THE DRAWINGS

Figure 1:
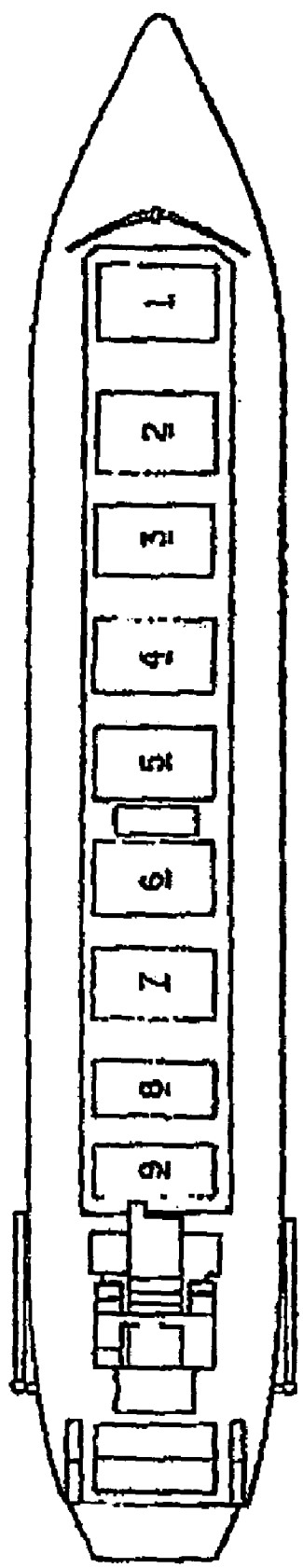
FIG. 1 is a diagrammatic top plan view of a typical ship to which the system and method of the present invention could be applied.
Figure 2:
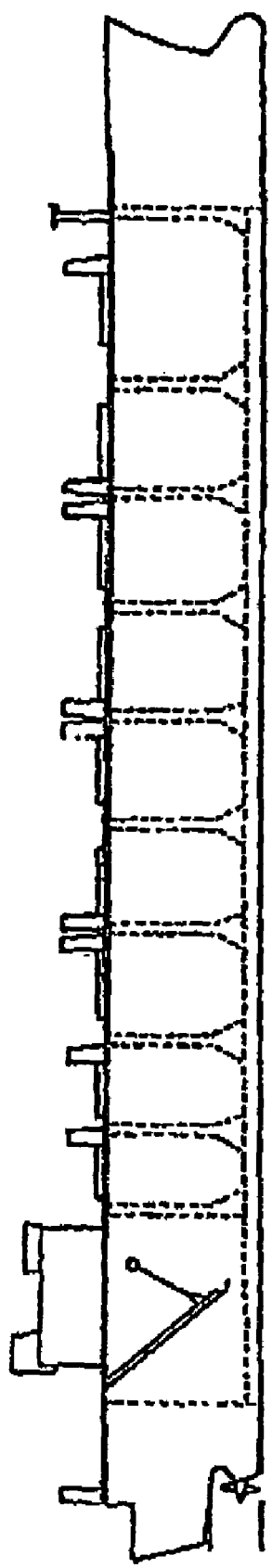
FIG. 2 is a side view of the ship illustrated in FIG. 1.

Illustrated in FIGS. 1 and 2 is a diagrammatic representation of a typical large vessel, in many aspects, on which embodiments of the present invention would be used to treat ballast water stored in her holds. The cargo holds are numbered from 1–9, counting forward to aft. This vessel is also typical in that it would need to carry water ballast in one or more of her holds in order to safely transit open-ocean voyages without cargo.

Figure 3:
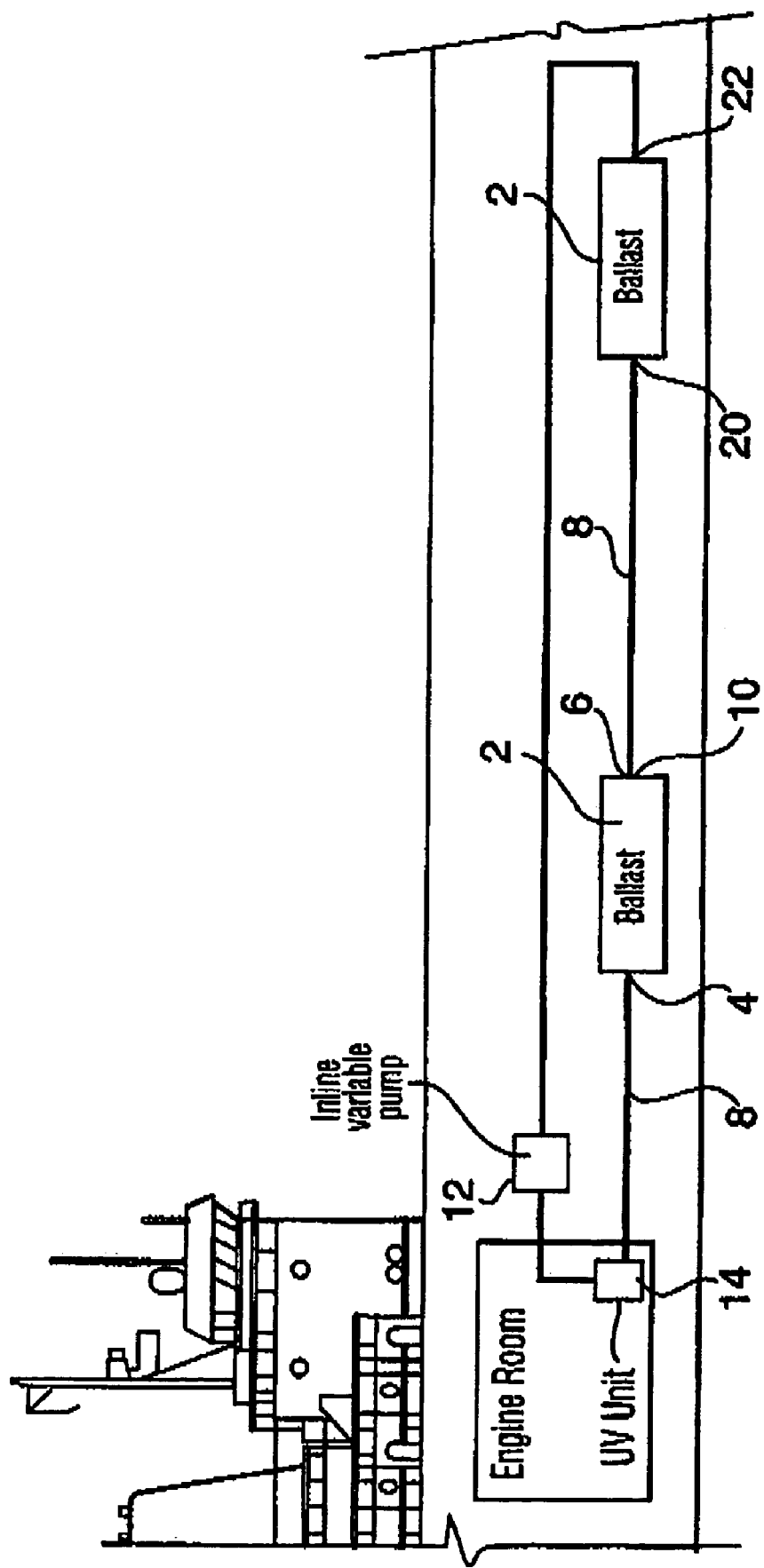
FIG. 3 is a partial side view of a ship including a treatment system of one embodiment of the present invention.

FIG. 3 is a flow diagram which illustrates one of the preferred embodiments of both the method and system of the present invention. Ballast water containing microorganisms is taken unto the ship or vessel and then stored in the ballast tanks or holds (2). There is provided on a hold or tank (2) an inlet opening (4) and an outlet opening (6), positioned on opposite sides from one another. From a hold (2), there is attached to the outlet opening (6) of a hold (2) a section of transfer pipe (8). This transfer pipe (8) may be connected and sealed to the outlet opening (6) by a connector (10), such as a sealing ring. The transfer pipe (8) is then placed, in a length as needed within the ship, to join together and interconnect a hold (2) containing ballast water, along with a dispensing pump (12), and a UV sterilization chamber (14), in a complete, sealed flow circuit, through which ballast water may flow. Referring to FIG. 3, the dispensing pump (12), when in its normal operation, forces water from the outlet opening (6) of a hold (2) to flow into the length of transfer pipe (8), from which the ballast water then enters an inlet opening (20) of an additional tank or hold (2), wherein the ballast water flows within the tank or hold (2), and out through the outlet opening of the additional hold (22). The ballast water is then forced into the transfer pipe (8) attached to the outlet opening of this additional hold (2) to be distributed to enter one end of the UV sterilizing chamber (14). Upon passing through this UV chamber (14), the ballast water is irradiated and undergoes a sterilization process by a UV radiation source, positioned within the UV sterilization chamber (14). Once the ballast water has passed within and throughout the length of the UV sterilizing chamber (14), the ballast water is then forced out of the opposite end of the UV chamber (14), both by the pumping action of the dispensing pump (12) as well as by the weight of more ballast water entering the UV chamber (14) from behind, to flow again into the length of transfer pipe (8) connected to the UV chamber (14). The ballast water then completes the flow circuit by journeying the length of the transfer pipe (8), into the inlet opening (4) of the hold (2) from which it originated.

Figure 4:
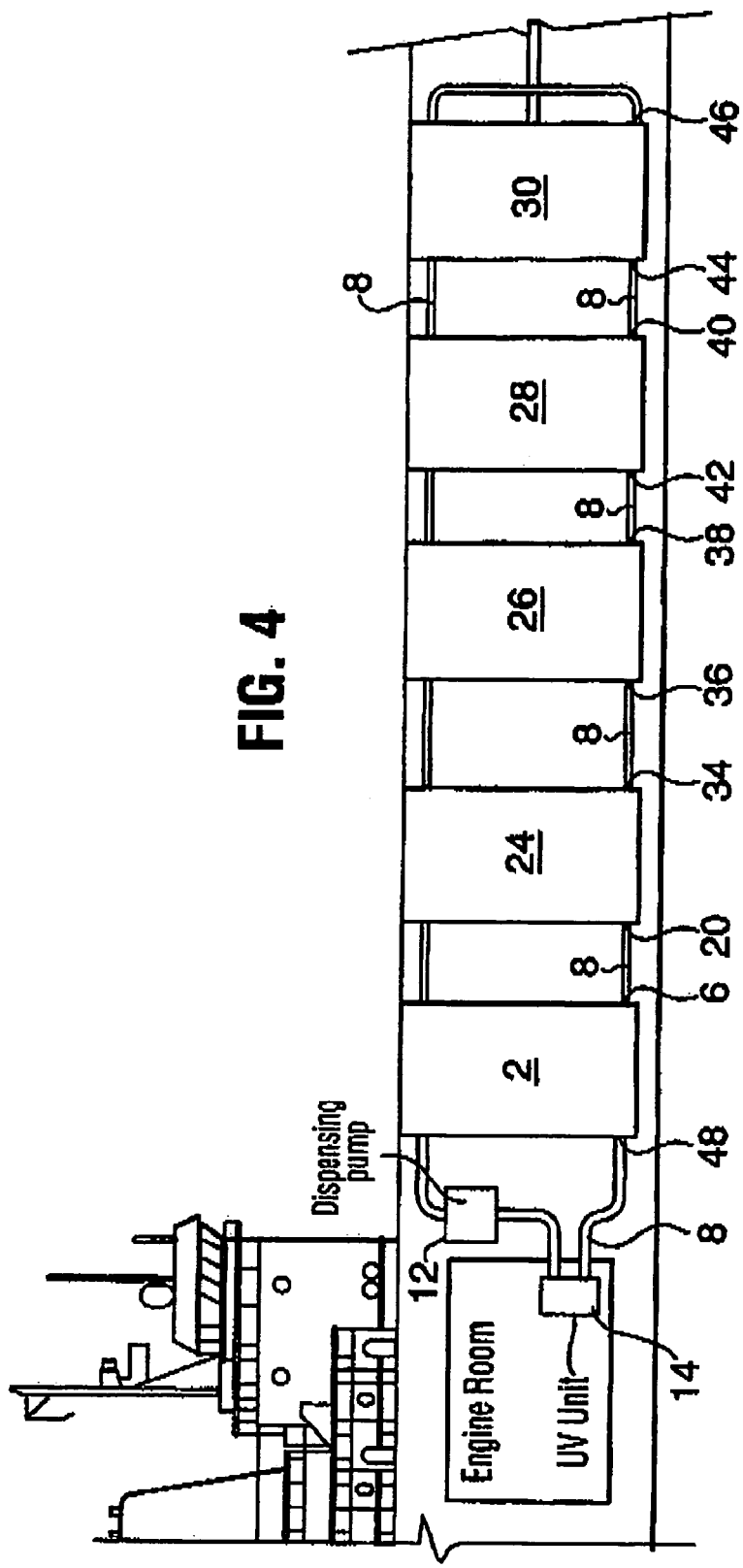
FIG. 4 is a side view broken away of the ship illustrated in FIG. 1. on a larger scale, illustrating a system according to another embodiment of the present invention wherein several ballast tanks are arranged in parallel.

FIG. 4 is a flow diagram illustrating several ballast holds linked together by transfer pipe, arranged in parallel, so that ballast water may be processed by a UV chamber. In this example, the transfer pipe again interconnects each of the ballast tanks with the UV sterilization chamber and the dispensing pump. Referring to the example provided in FIG. 4, the dispensing pump (12), when in its normal operation, forces water from the outlet opening (6) of a hold (2), for example, to flow into the length of transfer pipe (8), from which the ballast water then enters an inlet opening (20) of an additional tank or hold (24), wherein the ballast water flows within the tank or hold (24), and out through the outlet opening (34) of the additional hold (24). The ballast water is then forced into the transfer pipe (8) attached to the outlet opening (34) of this additional hold (24) to be distributed to the next hold (26), and in a similar manner enter the inlet opening (36) of this additional hold (26). The ballast water circulates within this tank (26), flowing out through the outlet opening (38) of this hold (26) into the transfer pipe (8) attached to the outlet opening (38) of this additional hold (26) to be distributed through the inlet opening of (42) of the next hold (28). From here, the ballast water in this tank (28) is then forced into the transfer pipe (8) attached to the outlet opening (40) of this additional hold (28) to be distributed to enter through the inlet opening (44) of the next hold (30), and in a similar manner flowing out through the outlet opening (46) of this hold (30) into the transfer pipe (8) attached to the outlet opening (46) of this additional hold (30) to then flow along the length of transfer pipe (8) to enter one end of the UV sterilizing chamber (14). Upon passing through this UV chamber (14), the ballast water is irradiated and undergoes a sterilization process by a UV radiation source, positioned within the UV sterilization chamber (14). Once the ballast water passes within and throughout the length of the UV sterilizing chamber (14), the ballast water is then forced out of the opposite end of the UV chamber (14), both by the pumping action of the dispensing pump (12) as well as by the weight of more ballast water entering the UV chamber (14) from behind, to flow again into the length of transfer pipe (8) connected to the UV chamber (14). The ballast water then completes the flow circuit by journeying the length of the transfer pipe (8), into and through the inlet opening (48) of the hold (2) from which it originated.

Figure 5:
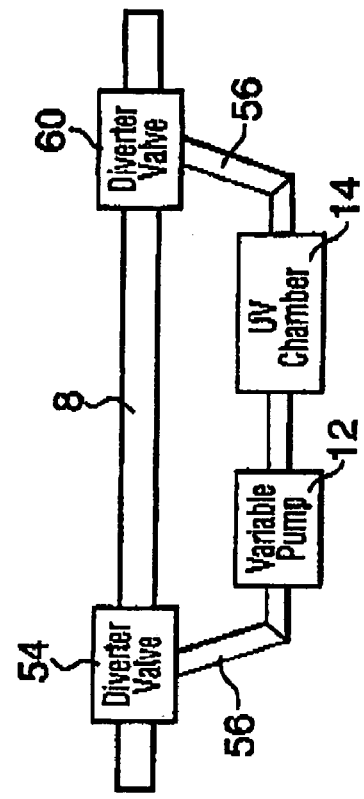
FIG. 5 is a diagram of a diverter valve assembly suitable for use with the present invention, wherein ballast water flow may be diverted to a secondary flow path containing a dispensing pump and UV chamber.

Referring to FIG. 5, the present invention illustrates an embodiment wherein ballast water flowing within the transfer pipe (8) may be diverted from the main flow circuit to a secondary flow circuit. In this diagram then, ballast water flowing along the length of transfer pipe (8), is then diverted by a diverter valve (54) to flow into a second transfer pipe (56) connected to the transfer pipe (8), and then pass through a dispensing pump (12). The ballast water is then forced out the opposite end of the dispensing pump (12) and back into the second transfer pipe (56) to enter one end of the UV sterilizing chamber (14). Upon passing through this UV chamber (14), the ballast water is irradiated and undergoes a sterilization process by a UV radiation source, positioned within the UV sterilization chamber (14). Once the ballast water has passed within and throughout the length of the UV sterilizing chamber (14), the ballast water is then forced out of the opposite end of the UV chamber (14), both by the pumping action of the dispensing pump (12) as well as by the weight of more ballast water entering the UV chamber (14) from behind, to flow again into the length of second transfer pipe (56) connected to the UV chamber (14). The ballast water then is pushed the length of the second transfer pipe (56) into and through a second diverter valve (60), where the flow of ballast water is again diverted to return to the transfer pipe (8), and the ballast water then returned from where it originated, to begin the cycle again.

Figure 6:
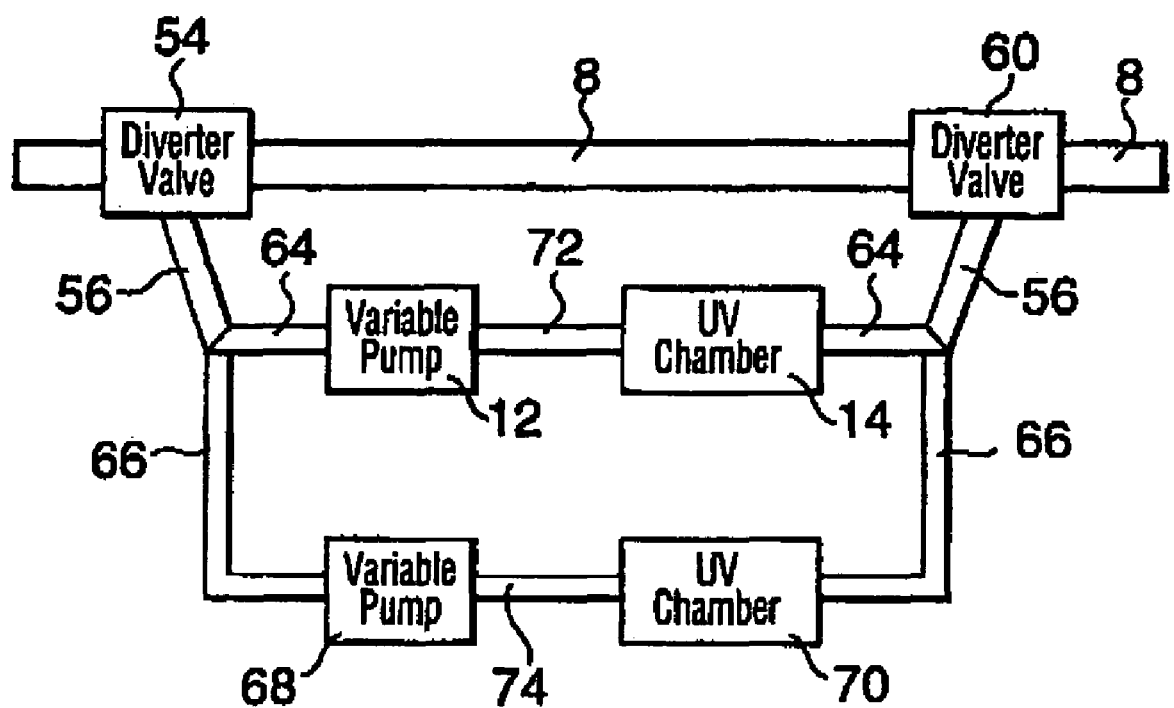
FIG. 6 is a diagram of another embodiment of the diverter valve assembly suitable for use with the present invention for treating ballast water, wherein additional dispensing pumps and UV chambers may be arranged in parallel to handle large volumes of ballast water.

Referring to FIG. 6, the present invention illustrates an embodiment wherein ballast water flowing within the transfer pipe (8) may be diverted from the main flow circuit to a secondary flow circuit, having parallel arrangements of dispensing pumps (12)(74) and UV chambers (14)(70) for UV processing. In this diagram then, ballast water flowing along the length of transfer pipe (8), is then diverted by a diverter valve (54) to flow into a second transfer pipe (56) connected to, and offset from, the transfer pipe (8). This second transfer pipe (56) may have several additional pipe sections attached thereto, noted here as just two additional pipe sections (64)(66), providing separate parallel channels, listed here, for example, as (72) and (74), for ballast water to flow where there are large volumes of water to process. Water flowing through the second transfer pipe section (56), then may pass into either of the additional pipe sections (64)(66). In the following example, once ballast water to be processed is forced additional pipe section (64), and within a particular channel (72), the ballast water may then pass through dispensing pump (12) to enter UV sterilizing chamber (14), that lies within the channel (72) the ballast water is currently within. Once the ballast water has passed within and throughout the length of these UV sterilizing chamber (14) the ballast water is then forced out of the opposite end of the UV sterilization chamber (14) both by the pumping action of the dispensing pump (12) located within the flow channels (72), the ballast water is currently in, as well as by the weight of more ballast water entering the UV sterilization chamber (14) from behind, to flow again into the additional pipe sections (64), where it will then flow to the length of second transfer pipe (56) connected to the UV sterilization chamber (14). The ballast water then is pushed the length of the second transfer pipe (56) to a second diverter valve (60), where the flow of ballast water is again diverted to return to the transfer pipe (8), wherein the ballast water will then flow back to the original ballast tank or hold, or series of ballast tanks or holds, from where it originated to begin the cycle again.

If ballast water flowing through the second transfer pipe section (56), passes into additional pipe section (66) flow into channel (74), for example, the ballast water may then pass through dispensing pump (68) to enter UV sterilizing chamber (70), that lies within the channel the ballast water is currently within (74). Upon passing through UV sterilization chamber (70), the ballast water is irradiated and undergoes a sterilization process by a UV radiation source, positioned within the UV sterilization chamber (70). Once the ballast water has passed within and throughout the length of these UV sterilizing chamber (70) the ballast water is then forced out of the opposite end of the UV sterilization chamber (70) both by the pumping action of the dispensing pump (68) located within the flow channels (74), the ballast water is currently in, as well as by the weight of more ballast water entering the UV sterilization chamber (70) from behind, to flow again into the additional pipe section (66), where it will then flow to the length of second transfer pipe (56) connected to the UV sterilization chamber (70). The ballast water then is pushed the length of the second transfer pipe (56) to a second diverter valve (60), where the flow of ballast water is again diverted to return to the transfer pipe (8), wherein the ballast water will then be returned from where it originated to begin the cycle again.

Figure 7:
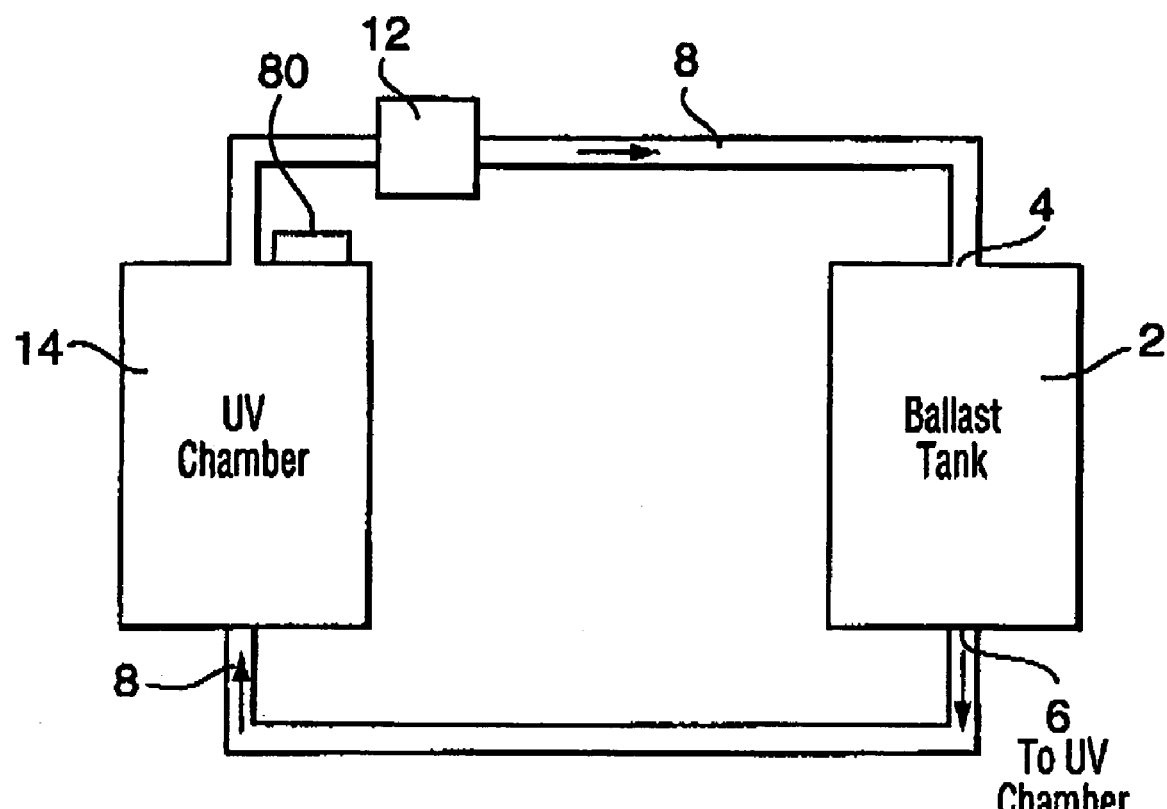
FIG. 7 is a diagram of an embodiment of the UV chamber featuring a UV intensity probe suitable for use with the present invention, wherein ballast water flows from a ballast tank within a flow path containing a dispensing pump and UV chamber.

Referring to FIG. 7, an embodiment is illustrated wherein ballast water is stored in the ballast tank or hold (2). There is provided on the hold or tank (2) an inlet opening (4) and an outlet opening (6), positioned on opposite sides from each another. Extending from the outlet opening (6) of the hold (2) is a section of transfer pipe (8). The transfer pipe (8) is proportioned in a length as needed within the ship, to join together and interconnect the hold (2) containing ballast water, along with a dispensing pump (12), and a UV sterilization chamber (14), in a complete, sealed flow circuit, through which ballast water may flow. The dispensing pump (12), when in its normal operation, forces water from the outlet opening (6) of a hold (2) to flow into the length of transfer pipe (8), from which the ballast water then enters one end of the UV sterilizing chamber (14). Upon passing through this UV chamber (14), the ballast water is irradiated and undergoes a sterilization process by a UV radiation source, positioned within the UV sterilization chamber (14), and the exposure rate or "residence time" of the ballast water, as well as the light intensity of the UV radiation irradiating the ballast water, within the chamber can be monitored by a UV intensity probe (80). It should be noted that the positioning of the UV probe (80) within the UV chamber (14) may vary depending upon the type or brand of UV sterilizing unit used in the treatment system. Once the ballast water has passed within and throughout the length of the UV sterilizing chamber (14), the ballast water is then forced out of the opposite end of the UV chamber (14), both by the pumping action of the dispensing pump (12) as well as by the weight of more ballast water entering the UV chamber (14) from behind, to flow again into the length of transfer pipe (8) connected to the UV chamber (14). The ballast water then completes the flow circuit by journeying the length of the transfer pipe (8), into the inlet opening (4) of the hold (2) from which it originated.

Figure 8:
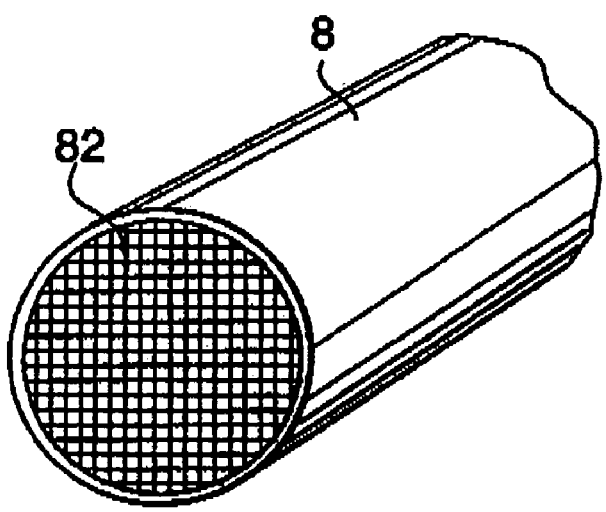
FIG. 8 is a diagram of one embodiment of a removable meshwork, or mechanical filtration system, suitable for use with the treatment system of the present invention, which can be used to cover water inlet and outlet openings.

FIG. 8 illustrates a particular embodiment wherein a mechanical filtration system, or metal meshwork (82), is shown, for example, as placed upon an end of a section of transfer pipe (8). This section of pipe would then be placed within and secured to a connector such as a flange which can be bolted or welded to inlet or outlet openings within the present UV ballast water treatment system.

Figure 9:
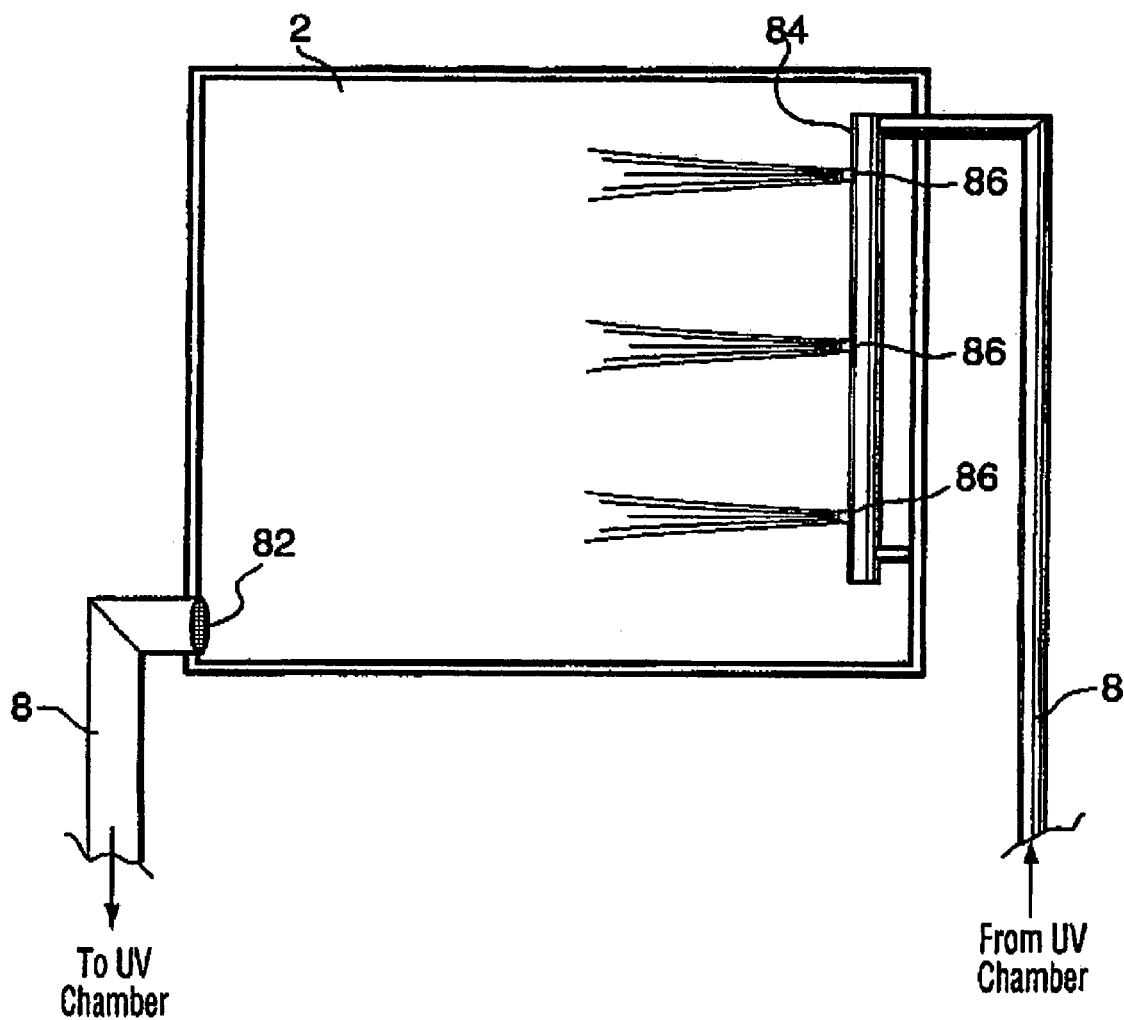
FIG. 9 is a cutaway diagram illustrating another embodiment of the present invention, wherein a support rack including flow jet nozzles may be attached to the side of a ballast tank or hold to assist in circulating ballast water within the tank.

Referring to FIG. 9, there is illustrated an embodiment wherein ballast water is stored in the ballast tank or hold (2). Sections of transfer pipe (8), as noted previously, connect the ballast tank or hold (2) to the rest of the UV ballast water treatment system, and the inlet and outlet openings of the ballast tank or hold (2), each have the mechanical filtration system, or meshwork (82), attached where the transfer pipe (8) is linked to the ballast tank or hold (2). It is also conceivable that the filter may be positioned in locations all along the length of the transfer pipe. There is provided in the hold or tank (2), a support rack (84), which contains a plurality of flow jet nozzles (86). The support rack (84) is secured and positioned, in this embodiment, on a side of the tank or hold (2), but can readily be positioned equally well on the bottom of the tank or hold (2). In this embodiment, as the ballast water located within the tank or hold (2) begins to flow through the UV treatment system, flowing from the UV chamber, the plurality of flow jet nozzles (86) operates to introduce and circulate as well as mix the ballast water within the tank or hold (2), and ensure that the ballast water, within each of the tanks or holds (2) where the flow jets nozzles (86) are located, does not settle into any "dead" pockets, these being pockets of water that may be continuously left behind as ballast water is cycled from one inlet opening of the tank or hold and out of the outlet opening of the tank or hold. This could typically be expected where ballast water within the tank or hold is located further from the inlet and outlet openings of the ballast tank or hold. The flow jet nozzles (86) thus ensure that adequate mixing, and thus water movement, of ballast water occurs, and increases the sterilization abilities of the present invention. Depending upon the individual requirements and design of each ship utilizing the present invention, the flow jet nozzles (86) may be, as illustrated in FIG. 9, connected and integral to the transfer pipe (8), and part of the ballast water flow circuit of the present invention. Alternatively, ballast water could also be diverted from the normal UV sterilization process of the present invention, through the use of additional piping connected to the flow circuit, to emerge from the flow jet nozzles in a high pressure stream to assist in circulating the ballast water within each tank or hold.

The foregoing are exemplary embodiments of the present invention and a person skilled in the art would appreciate that modifications to these embodiments may be made without departing from the scope and spirit of the invention.

Industrial Applicability

The invention provides a method and system for continuously treating large volumes of ship ballast water enroute to reduce or eliminate harmful microorganisms therefrom, by continually passing ballast water through an interconnected UV sterilization system, which may incorporate one or more UV units, for treatment by ultraviolet radiation, by way of a secondary piping system and dispensing pumps which transport the ballast water through the length of the UV system.

The invention claimed is:

1. A method of treating ship ballast water to reduce or eliminate the content of microorganisms therein, which is characterized in the steps of:
    adapting the ballast tank to provide an inlet opening and an outlet opening on opposing sides of the ballast tank for allowing pipe access thereto, whereby the flow of the ballast water into and out of the ballast tank can occur;
    providing a dispensing pump having an opening for pipe access thereto, and adapted to transfer or cycle the ballast water;
    positioning a source of UV radiation within a treatment site having an opening for pipe access thereto;
    providing a transfer pipe operably interconnecting the dispensing pump, the treatment site and the ballast tank, whereby the transfer pipe operably links together the openings whereby ballast water can be transferred therein;
    providing a seal interconnecting the openings to the transfer pipe to prevent the ballast water from leaking as it is transferred or cycled;
    transferring ballast water from a ballast tank of a ship to a treatment site;
    subjecting transferred ballast water to the source of UV radiation for a time and at a sufficient intensity to significantly reduce the content of living organisms and microorganisms therein;
    monitoring UV exposure rate of the ballast water through use of a UV intensity probe positioned within the treatment site; and
    cycling treated ballast water back to a ballast tank or hold or another ballast tank or hold of the ship.

2. A method of treating ship ballast water to reduce or eliminate the content of microorganisms therein, which is characterized in the steps of:
    adapting the ballast tank to provide an inlet opening and an outlet opening on opposing sides of the ballast tank for allowing pipe access thereto, whereby the flow of the ballast water into and out of the ballast tank can occur;
    providing a dispensing pump having an opening for pipe access thereto, and adapted to transfer or cycle the ballast water;
    positioning a source of UV radiation within a treatment site having an opening for pipe access thereto;
    providing a transfer pipe operably interconnecting the ballast tank and a second transfer pipe, the second transfer pipe operably interconnecting the dispensing pump and the treatment site, whereby ballast water can be transferred therein;
    providing a seal interconnecting the openings to the transfer pipe and the second transfer pipe to prevent the ballast water from leaking as it is transferred or cycled;
    providing a filter operably positioned within the transfer pipe, whereby the flow of ballast water into and through the transfer pipe can be filtered;
    positioning a diverter valve within the transfer pipe wherein the flow of ballast water travelling within the transfer pipe can be diverted to the second transfer pipe, and wherein the second transfer pipe interconnects the treatment site and the dispensing pump, to transfer ballast water therethrough;
    transferring ballast water from a ballast tank of a ship to the transfer pipe;
    transferring ballast water from the transfer pipe to the second transfer pipe;
    subjecting transferred ballast water to the source of UV radiation for a time and at a sufficient intensity to significantly reduce the content of living organisms and microorganisms therein;
    monitoring UV exposure rate of the ballast water through use of a UV intensity probe positioned within the treatment site;
    transferring ballast water from the second transfer pipe to the transfer pipe; and
    cycling treated ballast water from the transfer pipe back to a ballast tank or hold or another ballast tank or hold of the ship.

3. A method of treating ship ballast water to reduce or eliminate the content of microorganisms therein, which is characterized in the steps of:
    transferring ballast water from a ballast tank or hold of a ship to a treatment site;
    subjecting transferred ballast water in said treatment site to UV radiation for a time and at a sufficient intensity to significantly reduce or eliminate the content of living microorganisms and organisms therein, and
    cycling treated ballast water back from the treatment site to ballast tank or hold of the ship,
    wherein at least one of said transferring or cycling steps comprises transferring or cycling the ballast water through one or more ballast tanks of a ship that are arranged in parallel.

4. A method of treating ship ballast water to reduce or eliminate the content of microorganisms therein, which is characterized in the steps of:
    transferring ballast water from a ballast tank or hold of a ship to a treatment site;
    subjecting transferred ballast water in said treatment site to UV radiation for a time and at a sufficient intensity to significantly reduce or eliminate the content of living microorganisms and organisms therein, and
    cycling treated ballast water back from the treatment site to ballast tank or hold of the ship,
    at least one of said transferring and cycling steps comprises transferring or cycling ballast water in a variable direction.

5. A system for treating ship ballast water to reduce or eliminate the content of microorganisms therein, which is characterized by providing:
    a treatment site;
    means for transferring ballast water from a ballast tank or hold of a ship to said treatment site;
    UV radiation means for subjecting transferred ballast water in said treatment site to UV radiation to reduce or eliminate organisms and microorganisms therefrom; and
    means for cycling treated water back from the treatment site to a ballast tank or hold of the ship,
    characterized in that UV intensity probe means are positioned within the treatment site to monitor UV exposure rate of the ballast water.

6. A system of treating ship ballast water to reduce or eliminate the content of microorganisms therein, comprising:
- a ballast tank having an inlet opening and an outlet opening on opposing sides of the ballast tank for allowing pipe access thereto, whereby a flow of the ballast water into and out of the ballast tank can occur;
- pump means having an opening for pipe access thereto, and adapted to transfer or cycle the ballast water;
- UV radiation means positioned within a treatment site having an opening for pipe access thereto;
- transfer pipe means operably interconnecting the pump means, the treatment site and the ballast tank, whereby the transfer pipe means operably links together the openings whereby ballast water can be transferred therein;
- sealing means adapted to seal the openings to the transfer pipe means interconnecting the openings to prevent the ballast water from leaking as it is transferred or cycled;
- means to transfer ballast water from a ballast tank or hold of a ship to a treatment site;
- irradiating means for irradiating transferred ballast water in treatment site to UV radiation to significantly reduce or eliminate organisms and microorganisms therein;
- UV intensity probe means positioned within the treatment site to monitor UV exposure rate of the ballast water; and
- means to cycle treated ballast water from the treatment site back to a ballast tank or hold or another ballast tank or hold of the ship.

7. A system of treating ship ballast water to reduce or eliminate the content of microorganisms therein, comprising:
- a ballast tank having an inlet opening and an outlet opening on opposing sides of the ballast tank for allowing pipe access thereto, whereby the flow of the ballast water into and out of the ballast tank can occur;
- pump means having an opening for pipe access thereto, and adapted to transfer or cycle the ballast water;
- UV radiation means positioned within a treatment site having an opening for pipe access thereto;
- transfer pipe means operably interconnecting the ballast tank and a second transfer pipe means, the second transfer pipe means operably interconnecting the pump means and the treatment site, whereby ballast water can be transferred therein;
- filter means operably positioned within the transfer pipe means, whereby the flow of ballast water into and through the transfer pipe can be filtered;
- diverter valve means positioned within the transfer pipe means wherein the flow of ballast water travelling within the transfer pipe means can be diverted to the second transfer pipe means, and wherein the second transfer pipe means interconnects the treatment site and the pump means, to transfer ballast water therethrough;
- sealing means adapted to seal the openings to the transfer pipe means and the second transfer pipe means interconnecting the openings to prevent the ballast water from leaking as it is transferred or cycled;
- means to transfer ballast water from a ballast tank or hold of a ship to the transfer pipe means;
- means to transfer ballast water from the transfer pipe means to the second transfer pipe means;
- means to transfer ballast water from the second transfer pipe means to the treatment site;
- irradiating means for irradiating transferred ballast water to the UV radiation means for a time and at a sufficient intensity to significantly reduce the content of living organisms and microorganisms therein;
- UV intensity probe means positioned within the treatment site to monitor UV exposure rate of the ballast water;
- means to transfer ballast water from the treatment site to the second transfer pipe means;
- means to transfer ballast water from the second transfer pipe means to the transfer pipe means; and
- means to cycle treated ballast water from the transfer pipe means back to a ballast tank or hold or another ballast tank or hold of the ship.

8. The system of claim 7, characterized in that the second transfer pipe means can be lengthened by connecting additional pipe sections to the second transfer pipe means.

9. A system for treating ship ballast water to reduce or eliminate the content of microorganisms therein, which is characterized by providing:
- a treatment site;
- means for transferring ballast water from a ballast tank or hold of a ship to said treatment site;
- UV radiation means for subjecting transferred ballast water in said treatment site to UV radiation to reduce or eliminate organisms and microorganisms therefrom; and
- means for cycling treated water back from the treatment site to a ballast tank or hold of the ship,
- characterized in that ballast water can be transferred or cycled through one or more ballast tanks of a ship arranged in parallel.

10. A system for treating ship ballast water to reduce or eliminate the content of microorganisms therein, which is characterized by providing:
- a treatment site;
- means for transferring ballast water from a ballast tank or hold of a ship to said treatment site;
- UV radiation means for subjecting transferred ballast water in said treatment site to UV radiation to reduce or eliminate organisms and microorganisms therefrom; and
- means for cycling treated water back from the treatment site to a ballast tank or hold of the ship,
- characterized in that flow jet means are provided on the sides or bottom of the ballast tank adapted to circulate the ballast water.

11. A system for treating ship ballast water to reduce or eliminate the content of microorganisms therein, which is characterized by providing:
- a treatment site;
- means for transferring ballast water from a ballast tank or hold of a ship to said treatment site;
- UV radiation means for subjecting transferred ballast water in said treatment site to UV radiation to reduce or eliminate organisms and microorganisms therefrom; and
- means for cycling treated water back from the treatment site to a ballast tank or hold of the ship,
- characterized in that a direction for continuously cycling ballast water is variable.

12. A system for treating ship ballast water to reduce or eliminate the content of microorganisms therein, which is characterized by providing:
- a treatment site;
- means for transferring ballast water from a ballast tank or hold of a ship to said treatment site;

UV radiation means for subjecting transferred ballast water in said treatment site to UV radiation to reduce or eliminate organisms and microorganisms therefrom; and means for cycling treated water back from the treatment site to a ballast tank or hold of the ship, characterized in that more than one pump means are used to cycle ballast water.

13. A system for treating ship ballast water to reduce or eliminate the content of microorganisms therein, which is characterized by providing:

a treatment site;

means for transferring ballast water from a ballast tank or hold of a ship to said treatment site;

UV radiation means for subjecting transferred ballast water in said treatment site to UV radiation to reduce or eliminate organisms and microorganisms therefrom; and means for cycling treated water back from the treatment site to a ballast tank or hold of the ship, characterized in that means for transferring is a transfer pipe means, and said transfer pipe means can be lengthened by connecting additional pipe sections to said transfer pipe means.

14. A system for treating ship ballast water to reduce or eliminate the content of microorganisms therein, which is characterized by providing:

a treatment site;

means for transferring ballast water from a ballast tank or hold of a ship to said treatment site;

UV radiation means for subjecting transferred ballast water in said treatment site to UV radiation to reduce or eliminate organisms and microorganisms therefrom; and means for cycling treated water back from the treatment site to a ballast tank or hold of the ship, and a pump means, characterized in that power means to cycle said ballast water are provided by connecting an engine room of the ship to the pump means and the treatment site.

15. A system for treating ship ballast water to reduce or eliminate the content of microorganisms therein, which is characterized by providing:

a treatment site;

means for transferring ballast water from a ballast tank or hold of a ship to said treatment site;

UV radiation means for subjecting transferred ballast water in said treatment site to UV radiation to reduce or eliminate organisms and microorganisms therefrom; and means for cycling treated water back from the treatment site to a ballast tank or hold of the ship, and a pump means, characterized in that power means to cycle said ballast water are provided by connecting a generator to the pump means and the treatment site.

16. A system for treating ship ballast water to reduce or eliminate the content of microorganisms therein, which is characterized by providing:

a treatment site;

means for transferring ballast water from a ballast tank or hold of a ship to said treatment site;

UV radiation means for subjecting transferred ballast water in said treatment site to UV radiation to reduce or eliminate organisms and microorganisms therefrom; and means for cycling treated water back from the treatment site to a ballast tank or hold of the ship, characterized in that the treatment site is a UV sterilization chamber having an opening for pipe access thereto.

* * * * *